Patented June 7, 1927.

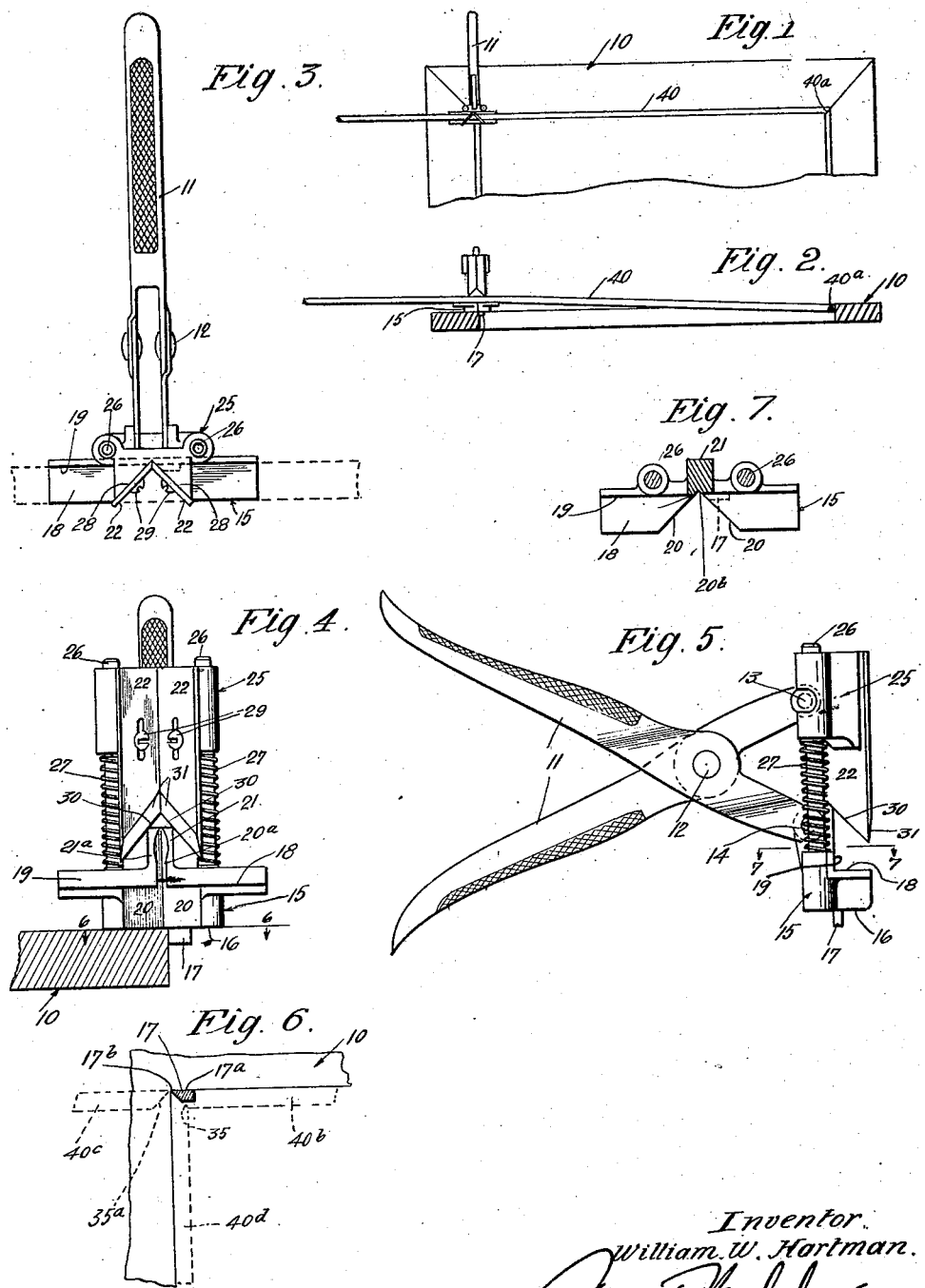

1,631,526

UNITED STATES PATENT OFFICE.

WILLIAM W. HARTMAN, OF LOS ANGELES, CALIFORNIA.

MOLDING CUTTER.

Application filed August 27, 1925. Serial No. 52,839.

This invention has to do with devices for cutting such elements as molds, beads, etc., and the primary object of the invention is to produce a simple, inexpensive and efficient form of cutter that may be easily used by a workman to cut molds, beads, etc., very accurately to fit the places for which they are intended.

In the manufacture of all kinds of doors, door and window frames, sash, frames of various kinds, and in the building of various other structures it is necessary to fit large numbers of beads or moldings in place. A typical instance is, for instance, the cutting and fitting of quarter round or other molds on screen doors. Ordinarily this work has been done by workmen first cutting one end of a piece to the proper angle, holding the piece in place against the door, marking the requisite length, then removing the piece to a miter saw or miter cutter and cutting at the previously made mark. All these things involve time, unnecessary movements on the part of the workman, and also involve inevitably a certain amount of error. It is highly advantageous that such molds be fitted tightly; and my invention provides for such accuracy in cutting that the molds always fit tightly, and also does away with many of the excess movements and therefore obviates a good deal of lost time.

As will be understood from the following detailed description, my cutter involves a small hand operated instrument that is held in a certain relation to the work while the mold is held in position; the cut is then made without removing the mold from the work, and the mold will then accurately and tightly fit. The device I herein explain is a typical and illustrative embodiment of the invention, and I explain it in detail not for the purpose of limiting the invention to such details, but for the purpose of giving a clear and full understanding of the invention itself through the medium of giving a full description of this specific and now preferred embodiment. For this purpose I refer to the accompanying drawings, in which:

Fig. 1 is an elevation showing the application of my cutter to the work;

Fig. 2 is an end view thereof;

Fig. 3 is a plan of the cutter itself;

Fig. 4 is an end view of the cutter;

Fig. 5 is a side view of the cutter;

Fig. 6 is a detailed section taken on line 6—6 of Fig. 4; and

Fig. 7 is a detailed section on line 7—7 of Fig. 5.

In the drawings I show a typical screen door at 10 and I illustrate the cutter in its operations of cutting the mold or bead for such a door. In a convenient form, the cutter is operated by handles 11 pivoted together at 12 and pivotally connected at 13 and 14 to the two relatively movable handles of the cutter. As shown in the drawings the lower element 15 is formed with a lower flat face 16 which has a gauge shoulder 17 projecting downwardly; and when the cutter is in working position this gauge shoulder fits into the corner that the cutting end of the mold has to fit into. This position of gauge shoulder 17 is shown in Fig. 6. Element 15 has a work supporting surface 18 and another surface 19 standing at right angles to surface 18 and against which the work may be backed up. Surface 19 is substantially in line with or in the plane of the back surface 17$^a$ of gauge shoulder 17, as is shown in Fig. 7. In this element 15 there is a diagonally machined notch with two walls or surfaces 20 that, for a 45° cut, stand at 90° to each other and at 45° to the back surface 19. The two surfaces 20 meet or have their apex at a point somewhat behind the back surface 19, and upward extensions 20$^a$ of these two surfaces are formed in a block 21 as is clearly shown in Figs. 4 and 7. These surfaces 20 and their extensions 20$^a$ form guide surfaces for the backs of the two cutters 22, also block 21 has surfaces 21$^a$ that form upward extensions of backing surface 19, so as to back those parts of a mold, at and near the cut, that may extend above the upper edge of backing surface 19; and the meeting corners of these cutters extend clear back into the angle or apex of surface 20, so that the rear edges of the cutters are well behind the back surface of the mold or bead that is placed against surface 19. This arrangement prevents the back edges of the cutters from "riding over" the bead or mold and prevent wedging of any wood between the back edges of the cutters and the surface 19. These two surfaces 20 form, where they meet the mold supporting surface 18, cutting edges at which the mold or bead is sheared by cutters 22.

The other relatively movable element 25 of the device slides on two cylindrical guide posts 26 which are mounted in element 15, springs 27 being interposed so that normally the several parts will stand in the relative positions illustrated in the drawings. Compression of handles 11 causes downward movement of element 25 toward element 15, and causes cutters 22 to move down on what may be termed the work supporting table (formed in element 15) to cut the mold or bead. Cutters 22 are adjustably and removably secured at 29 against two surfaces 28 on element 25, these surfaces corresponding in relative position to surfaces 20 and being directly above them, so that the back faces of cutters 22 (the faces of the cutters that are against surfaces 28) are directly in the planes of surface 20. The lower ends of the cutters are made to have diagonal cutting edges 30 so as to get shearing cuts on the mold or bead; and these diagonal cutting edges are so arranged, as will be apparent from an inspection of Fig. 5, that their action is to push the work back against face 19 rather than to push the work away from that face. The cutters are beveled at 31 on their forward faces so that cutting edges 30 lie in the planes of their back faces, and so that the cutting edges are accurately in the planes of surfaces 20.

From what has been said it will now be apparent how a mold or bead may be cut at any predetermined angle by placing the work in the cutter on surface 18 and back against surface 19, and by compressing handles 11. The cutters move down on the work shearing it with a smooth cut, and when the cutters come to a stop, the cutting edge 30 has passed completely through the work. When the cutters reach their stop position the points of the cutters have not passed below the lower flat surface 16 of element 15 and the points are thus prevented from marring or injuring any work on which the cutter is placed. The stop for the downward movement of the cutters may conveniently be provided by so proportioning springs 27 that they are fully compressed when the cutter reaches a position where its edge 30 has passed entirely through the work. It will be seen that when a piece of work is cut by this cutter two cuts are made, each at (in the instance given) 45° to the length of the mold or bead, and the two cuts at right angles to each other. These two cuts are a little separated from each other even at what may be termed the toe of the cut, due to the fact that the cutters at their back edges extend slightly behind surface 19; but this is of no consequence in the practical operation of the cutter. The toe of one cut, as will readily be seen, comes at a point that corresponds to the point marked 20$^b$ in in Fig. 7; and it is directly under this point 20$^b$ that the end on corner 17$^b$ of gauge shoulder 17 is located. This is clearly shown in Fig. 7. Consequently when the tool is applied as indicated in the drawings, with gauge shoulder 17 in a corner of a door frame, as shown in Fig. 6, and a mold or bead is placed in the cutter, the cut indicated at 35 in Fig. 6 will be made on a plane that passes directly through the end or corner 17$^b$ of gauge shoulder 17, and therefore the cut will be made so that its toe will fit tightly into the corner in which shoulder 17 was placed when the cut was made.

In using my tool the workman will first make a cut at one end of a long piece of beading, such as shown at 40, and then he will place that first cut end 40$^a$ in the corner of the frame into which it is to fit, and then he will place the tool in its proper position in the opposite corner, with shoulder 17 in the corner, and then he will place the piece of bead or mold in the tool and then make his cut. Due to the fact that work supporting surface 18 is slightly above surface 16, which rests on the door frame, the piece of molding will be in a slightly diagonal position as shown in that figure, the molding lying flatly on surface 18. This, however, is not a source of inaccuracy, at least when cutting moldings to ordinary lengths. The cut having been made, then the cut piece of molding indicated at 40$^b$ in Fig. 6 is of just the correct length to fit between the two intended corners. It is desired in placing such moldings that they fit fairly tightly; and this tightness of fit may be originally determined by the exact placement of gauge shoulder 17; or if it is desired to fit the molding a little more tightly, this may be done by holding the end 40$^c$ of molding 40 in its proper corner and then, instead of allowing the molding in its slightly diagonal position (as shown in Fig. 2) to induce a diagonal or tipped position of the cutter, the cutter may be maintained upright and the molding slightly bent and the cut made while the cutter and work are in these positions. This will slightly increase the length of the cut piece so as to make it fit more tightly if desired. But in any case, it will be seen that, without any manipulation on the part of the workman calling for judgment, the molding may easily be cut exactly to the required length and the workman has done all this without moving away from the door or other structure he is working on. He cuts the required length of molding and then immediately fits it in place. At the same time that he has made the cut 35 he has also made the other cut before referred to, as shown at 35$^a$ in Fig. 6. This cut 35$^a$ at the end of the remaining part of the molding length enables the workman immediately to take that remaining length, indicated at 40$^c$ in Fig. 6, and place it in position as indicated at 40$^d$ in Fig. 6 to be cut for the next piece to be fitted. Thus at the same time the final cut is made on one piece and the beginning cut is made on the next piece. The work may thus progress very rapidly as well as very accurately.

I claim:

A device of the character described comprising two relatively movable elements, the lower one of which carries upwardly extending guide posts and the upper one of which is slidable on said guide posts, means connected with the two elements for moving them toward each other, springs around the guide posts tending to move the elements away from each other, the lower element having a flat under face and having a downwardly projecting gauge shoulder thereon, and said lower element having an upwardly facing work supporting surface and a vertical work backing surface above the work supporting surface, a V-shaped notch cut into said lower element through its two last mentioned surfaces, said notch having cutter guiding faces that lie at predetermined angles to the work backing surface, an upward extension to said lower element carrying upward extensions of said cutter guiding faces and also upward extensions of said work backing surface, said cutter guiding faces meeting along a vertical line situated behind the work backing surfaces; a pair of shearing cutters carried by the upper element with their two outside faces directly in the planes of the two cutter guiding faces, the lower ends of said cutters being formed with diagonal cutting edges in their outer faces, said diagonal edges being arranged so that they tend to press the work back against the work backing surface when the cutters are urged toward the work carried by the first mentioned element: and the gauge shoulder having an end adapted to be placed in a corner and lying substantially in line with the line where one of said cutter guiding faces meets the work backing surface.

In witness that I claim the foregoing I have hereunto subscribed my name this 7th day of August, 1925.

WILLIAM W. HARTMAN.